July 22, 1969  R. GARDON  3,457,057
GLASS CONVEYOR AND HEAT TREATING PROCESS
Filed Sept. 19, 1966  2 Sheets-Sheet 1
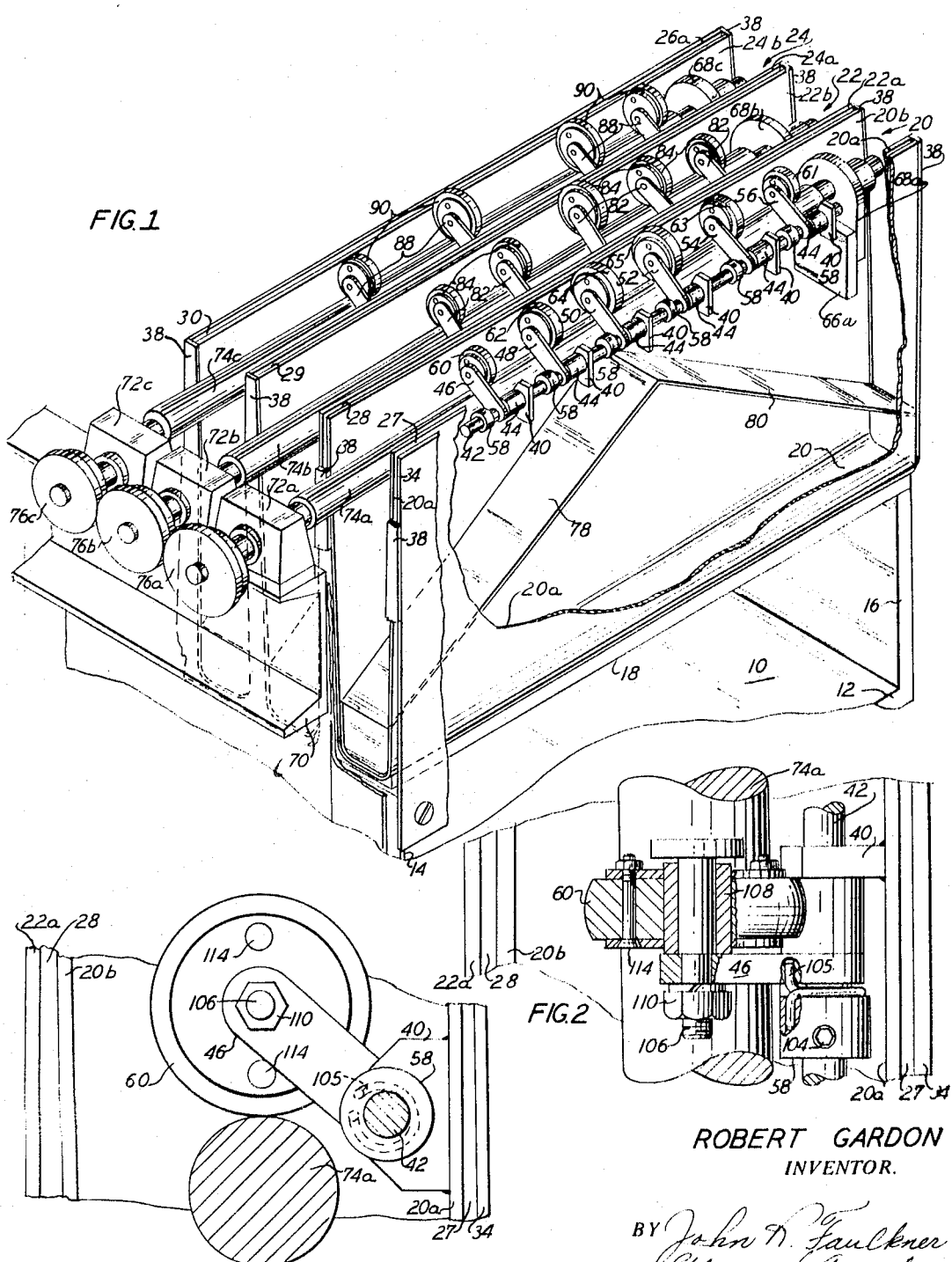
ROBERT GARDON
INVENTOR.
BY *John R. Faulkner*
*Glenn S. Arendsen*
ATTORNEYS

ROBERT GARDON
INVENTOR.

BY *John R. Faulkner*
*Glenn J. Arendsen*
ATTORNEYS

United States Patent Office 3,457,057
Patented July 22, 1969

3,457,057
GLASS CONVEYOR AND HEAT TREATING PROCESS
Robert Gardon, Farmington, Mich., assignor to Ford Motor Company, Dearborn, Mich., a corporation of Delaware
Filed Sept. 19, 1966, Ser. No. 580,401
Int. Cl. C03b 27/00
U.S. Cl. 65—114                          9 Claims

ABSTRACT OF THE DISCLOSURE

A plurality of disc-shaped rollers having different diameters are supported individually with the bottom surfaces contacting a rotating drive shaft. Curved sheets of glass are supported on and driven by the tops of the rollers, each of which has the same peripheral speed regardless of its diameter. Cool air directed at the surface of the glass by nozzles located between rows of the rollers quenches the glass surface.

---

This invention provides a materials handling system for transporting curved glass sheets of varying sizes and shapes. In particular, the handling system is useful for transporting curved glass sheets through the quenching or other heat treating stages of a tempering process, where the system comprises means for directing a quenching medium at the sheets. A process for heat treating curved glass sheets by supporting the sheets on the handling system also is provided.

In the manufacture of tempered glass, glass sheets are heated in a furnace and then quenched to produce the desired temper. During heating and quenching, the handling system must transport the sheets without applying excessive stresses thereto as such stresses cause uneven tempering or distortion. Various known handling systems transport flat glass sheets through this processing without applying excessive stress thereto, and some available handling systems can transport curved sheets of constant size and curvature effectively.

In the relatively new air float process of tempering glass, glass sheets are supported horizontally on an air film while being conveyed through the furnace. At the end of the furnace, the glass is quenched usually by reducing the temperature of the supporting air film and by directing cool air streams at the top. Further shaping or sizing of the glass is impossible at this stage and a practical conveying system must be capable of handling sheets with the variety of sizes and curvatures used in vehicles and other applications. Glass sheets in the initial stages of the quenching operation usually require the total support provided by the air film; in the later stages, however, it has been found more economical and convenient to support the glass sheets by mechanical means, although the mechanical means must avoid applying undue stresses thereto.

Curved glass is difficult to transport mechanically because cylindrical rollers provide support for the glass only at its edges and a shaped roller has a higher surface speed at its larger radius which can distort the glass or mar its surface. Further, separate mechanical handling systems have been required in the past to transport curved sheets of each significantly different curvature and size.

The handling system of this invention overcomes these difficulties by providing a conveyor comprising rows of axially separated disc-shaped rollers having differing diameters and driven at equal peripheral speeds regardless of diameter. Some of the rollers in each row are arranged so an imaginary envelope drawn over their tops conforms to the shape and size of the largest glass sheet expected. Sectors of the envelope then are useful for smaller sheets, and other rollers are positioned to provide for sheets having different curvatures. Nozzles can be interspersed with the rollers to direct fluid at the sheets capable of quenching or performing other heat treating operations. Additional fluid is directed at the top of the glass.

Ordinarily the rollers are disc shaped and relatively light; a variety of sizes can be kept on hand and changing a roller is an easy, inexpensive task. In case the sheet of glass being transported happens to break, the broken pieces drop between the nozzles and the rollers onto an inclined member that slides the broken pieces to the side of the handling system.

Details of construction and operation of the handling system of this invention are presented below in connection with a description of the drawings in which:

FIGURE 1 is a perspective view with portions cut away of a materials handling system for transporting curved glass sheets;

FIGURE 2 is a top detail view of a roller showing the supporting means for the roller;

FIGURE 3 is a side detail view of a roller showing the driving means and further details of the supporting means;

Figure 4:
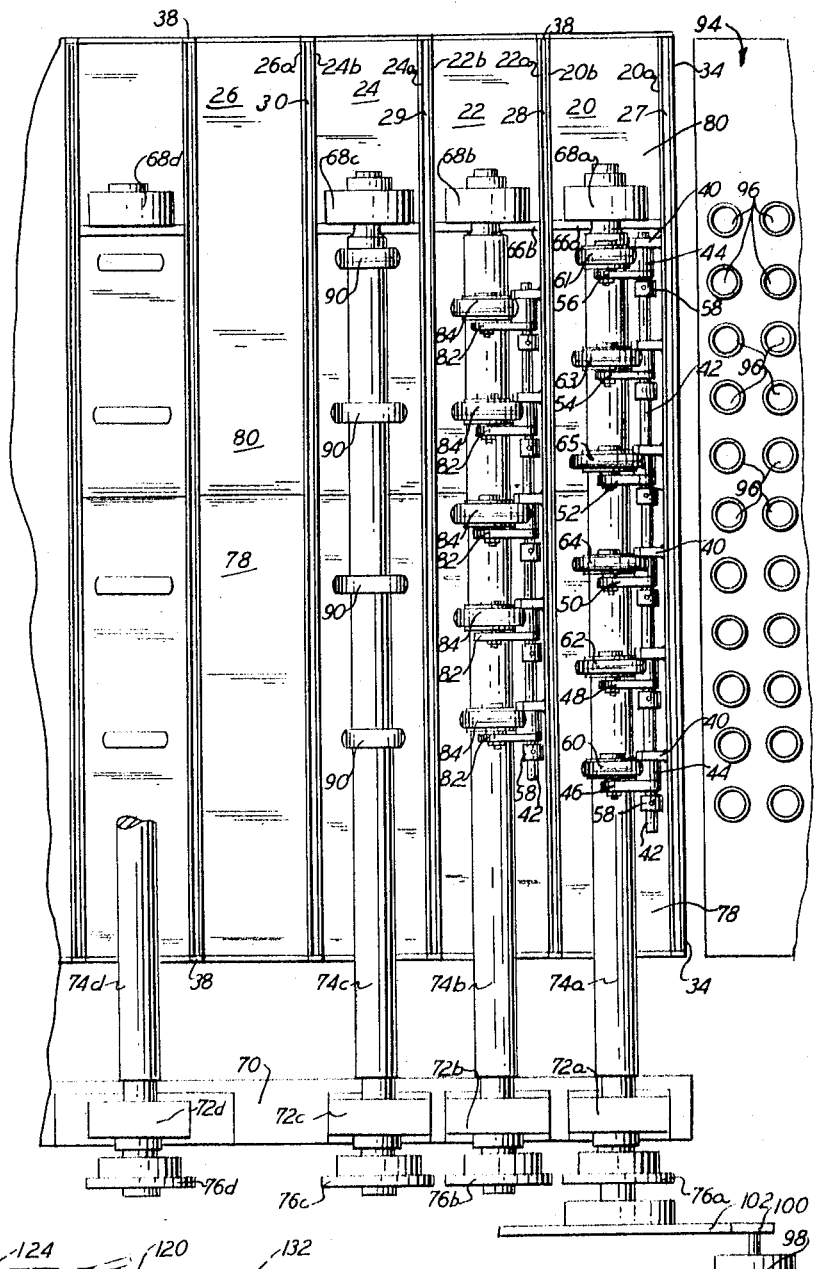
FIGURE 4 is a top view of the conveyor shown in FIGURE 1.

Referring to FIGURE 1, a plenum chamber indicated by the numeral 10 is formed by a floor member 12, side members 14 and 16 and a roof member 18. Air is supplied to the plenum chamber 10 by conventional means (not shown). A plurality of U-shaped members 20, 22, 24 and 26 are fastened adjacent to each other on top of roof member 18. The U-shaped members have elongated legs 20a, 20b, 22a, 22b, etc. Legs 20b and 22a are mounted adjacent each other to form a slot 28 opening across the top of the legs. Similarly, legs 22b and 24a form a slot 29, and legs 24b and 26a form a slot 30. A plate 34 cooperates with leg 20a of the first U-shaped member 20 to form the initial slot 27.

The spaces between plate 34 and leg 20a, leg 20b and leg 22a, leg 22b and leg 24a, leg 24b and leg 26a, etc., communicate at the bottoms of the legs with plenum chamber 10 through appropriate openings (not shown) in roof member 18. Side wall members 38 close the side openings between the adjacent legs.

Referring primarily to FIGURES 1, 2 and 3, a plurality of brackets 40 are fastened to the inside of first leg 20a a short distance below the top by conventional means such as welding. A support bar 42 passes through holes in brackets 40 transverse to the moving direction of the sheet being transported. Cylindrical spacers 44 are mounted on bar 42 adjacent each bracket 40. Next to each spacer 44, an arm designated by numerals 46, 48, 50, 52, 54 and 56 is pivotally mounted on bar 42. A plurality of collars 58 retain the arms in position on bar 42.

Disc-shaped rollers 60 and 61 having small diameters are mounted at the other ends of arms 46 and 56 respectively. Rollers 62 and 63 having intermediate diameters are mounted at the other ends of arms 48 and 54 and rollers 64 and 65 having large diameters are mounted at the other ends of arms 50 and 52, respectively. Arms 46 through 56 locate rollers 60 through 65 between legs 20a and 20b where they form a row transverse to the moving direction of glass sheets being transported.

Near one end of U-shaped member 20, a bracket 66a is welded between legs 20a and 20b. Bracket 66a is slightly below support bar 42. A bearing member 68a is attached to bracket 66a. At the other end of U-shaped member 20, a support bracket 70 is mounted outboard of wall members 38 on a pedestal (not shown). Bracket 70 has a plurality of bearing members 72a, 72b, 72c, etc., mounted thereon adjacent the openings between the legs of the U-shaped members.

A driving shaft 74a is mounted for rotation in bearing members 68a and 72a. Shaft 74a contacts the peripheral surfaces of rollers 60 through 65. A driving wheel 76a is attached to shaft 74a outboard of bearing member 72a.

Below bar 42 and shaft 74a, two inclined members 78 and 80 extend upward from each end of U-shaped member 20 and meet at the approximate center of U-shaped member 20. Inclined members 78 and 80 are welded to legs 20a and 20b at appropriate places for support.

Between legs 22a and 22b, arms 82 support rollers 84 that contact driving shaft 74b in substantially the same manner as the mechanism mounted between legs 20a and 20b and described above, except that only five rollers are located between legs 22a and 22b. Arms 82 can be of different lengths and rollers 84 can be of different diameters and widths if desired. Ordinarily, arms 82 and rollers 84 are sized to conform to the imaginary envelope formed by rollers 61 through 65.

Similarly, arms 88 support rollers 90 between legs 24a and 24b where they contact driving shaft 74c, except that only four rollers are located between legs 24a and 24b. Arms 88 can be of different lengths and rollers 90 can be of different diameters also. Driving shaft 74b is supported in bearing members 68b and 72b and driving shaft 74c is supported in bearing members 68c and 72c. Driving wheels 76b and 76c are located on the ends of shafts 74b and 74c, respectively.

Referring to FIGURES 2 and 3, collar 58 is fastened on support bar 42 by set screw 104. A spring 105 is anchored in collar 58 and is attached to arm 46 to urge roller 60 into contact with driving shaft 74. A pin 106 passes through a bushing 108 and is attached to arm 46 by threaded nut 110. Roller 60 is fastened to washer guides 112 by threaded means 114 and pivots about pin 106.

The top view of FIGURE 4 shows the air support section 94 located just prior to the handling system described above. Air support section 94 comprises a plurality of conventional air nozzles 96. The glass is moved along section 94 by frictional contact between the edge of the glass and a moving belt (not shown) or other conventional means. Also shown in FIGURE 2 is a motor 98 connected through conventional drive gears 100 and 102 to drive shaft 74a. A conventional chain or belt (not shown) is used to connect drive wheels 76b and 76c with drive wheel 76a so motor 98 turns drive shafts 74a, 74b and 74c.

Sheets of glass are supported on the handling system by rollers 60 through 65, 84 and 90. The surfaces of the rollers are made of asbestos or other materials that will not scratch, scuff or mar the glass. Rollers 60 through 65 are driven by shaft 74a at equal peripherad speeds regardless of roller diameter. Similarly, rollers 84 are driven by shaft 74b and rollers 90 are driven by shaft 74c at equal peripheral speeds. Any broken glass falls onto inclined members 78 and 80 which slide the pieces to the side of the conveyor. The arrangement of support bar 42, arms 46 et seq., and collars 58 provide for rapid changing and relocating of the rollers.

Air issuing from slots 28, 29 and 30 quenches the bottom surfaces of the glass sheets and air from nozzles (not shown) positioned above the sheets quenches the top surfaces.

Figure 5:
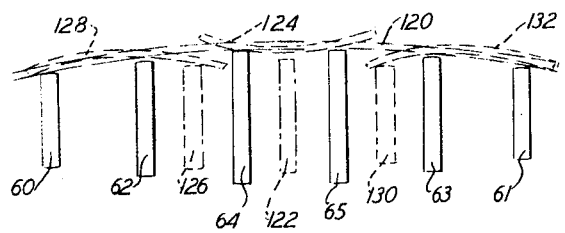
FIGURE 5 is a schematic end view of a row of rollers showing the various sizes and curvatures of glass that can be handled thereby.

In FIGURE 5, rollers 60 through 65 support large sheets of glass having a curvature indicated by dotted line 120. An additional roller 122 having a diameter approximately equal to rollers 62 is located between rollers 64 and 65 where it cooperates with rollers 64 and 65 to support glass sheets having a size and curvature indicated by dotted line 124. Similarly, additional roller 126 cooperates with rollers 60 and 62 to support sheets having sizes and curvatures indicated by dotted line 128, and additional roller 130 cooperates with rollers 63 and 65 to support sheets indicated by dotted line 132.

Thus, this materials handling system can transport curved glass sheets of various sizes and curvatures without marring or distortion even though the sheets are very susceptible thereto. Nozzles can be included to process the sheets while being transported. The driving and supporting arrangements for the rollers in the handling system insure that the rollers are driven at equal peripheral speeds regardless of roller diameter and that the rollers stay in contact with the driving means even when a glass sheet momentarily is not being carried.

What is claimed is:

1. In a materials handling system for transporting a curved glass sheet, a conveyor comprising:
   a row of axially separated rollers, said row being transverse to the moving direction of the article and supporting said glass sheet, at least one roller differing in diameter from at least one other roller in the same row, and
   driving means for driving said rollers at substantially equal peripheral speeds.

2. The handling system of claim 1 in which the driving means comprises a shaft contacting the peripheral surfaces of the rollers.

3. The handling system of claim 2 comprising
   a support arm for each of said rollers, each of said support arms having a roller mounted at the upper end and being pivotally mounted at the lower end, and
   a spring associated with each support arm for urging the peripheral surfaces of said rollers into contact with said shaft.

4. The handling system of claim 3 comprising a support bar located below the glass sheet and being transverse to the moving direction of the glass sheet, the lower ends of said support arms being mounted on said bar, and each spring having one end anchored to said bar and the other end connected to the support arm.

5. The handling system of claim 4 comprising:
   a plurality of said rows of rollers, and
   nozzle means interspersed with said rows of rollers for directing air at the underside of the glass sheet, said air serving as a quenching medium for said glass sheet.

6. The handling system of claim 5 in which the nozzle means comprises upstanding members forming slots transverse to the moving direction of the glass sheet, said upstanding members being separated by inclined members having lower ends opening on the side of the handling system.

7. The handling system of claim 1 comprising:
   a plurality of said rows of rollers, and
   nozzle means made up of an elongated slot extending transverse to the moving direction of the sheet and interspersed with said rows of rollers for directing air at the underside of the glass sheet, said air serving as a quenching medium for said glass sheet.

8. The handling system of claim 7 in which the nozzle means comprises upstanding members forming slots transverse to the moving direction of the glass sheet, said upstanding members being separated by inclined members having lower ends opening on the side of the handling system.

9. A process for thermally treating a moving glass sheet curved about an axis parallel to the direction of movement comprising: supporting the glass sheet on a plurality of rows of parallel axially separated rollers extending across the sheet, each row being transverse to the moving direction of said sheet, said rollers having diameters conforming to the curve of the glass sheet, driving said rollers at a substantially equal peripherial speed whereby substantially equal longitudinal moving forces are applied by each roller to said sheet, and while so conveyed directing a cooling medium against the curved glass sheet from nozzle means interspersed with said rollers at a flow rate sufficient to cool the sheet to a more viscous state.

References Cited

UNITED STATES PATENTS

| | | | |
|---|---|---|---|
| 1,756,653 | 4/1930 | McArthur | 198—127 |
| 3,372,016 | 3/1968 | Rahrig et al. | 65—114 |

S. LEON BASHORE, Primary Examiner

ARTHUR D. KELLOGG, Assistant Examiner

U.S. Cl. X.R.

65—119, 254, 351; 198—127